(No Model.)  4 Sheets—Sheet 2.
C. E. PATRIC.
SEEDING MACHINE.
No. 367,231. Patented July 26, 1887.
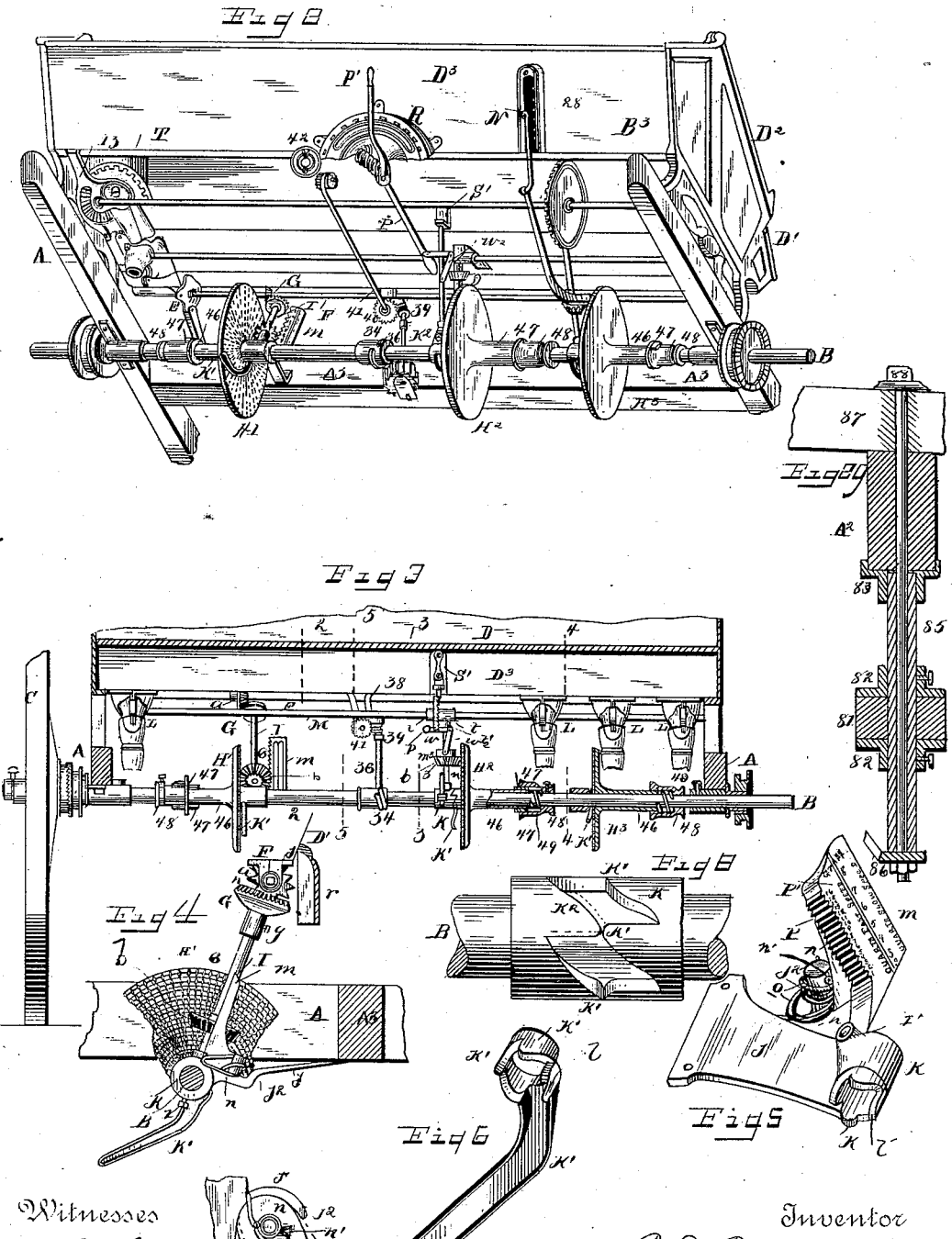

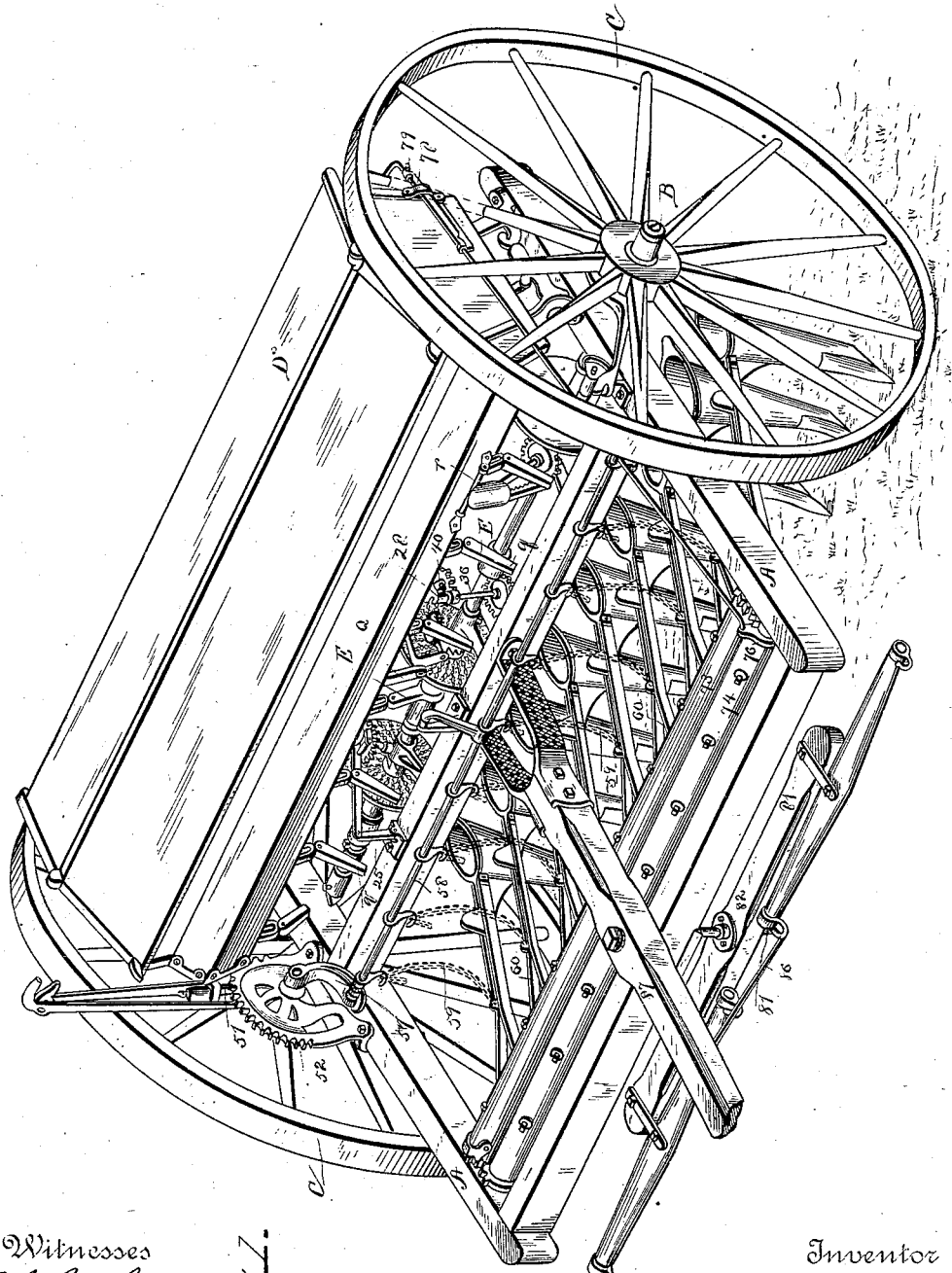

(No Model.) 4 Sheets—Sheet 3.
C. E. PATRIC.
SEEDING MACHINE.
No. 367,231. Patented July 26, 1887.
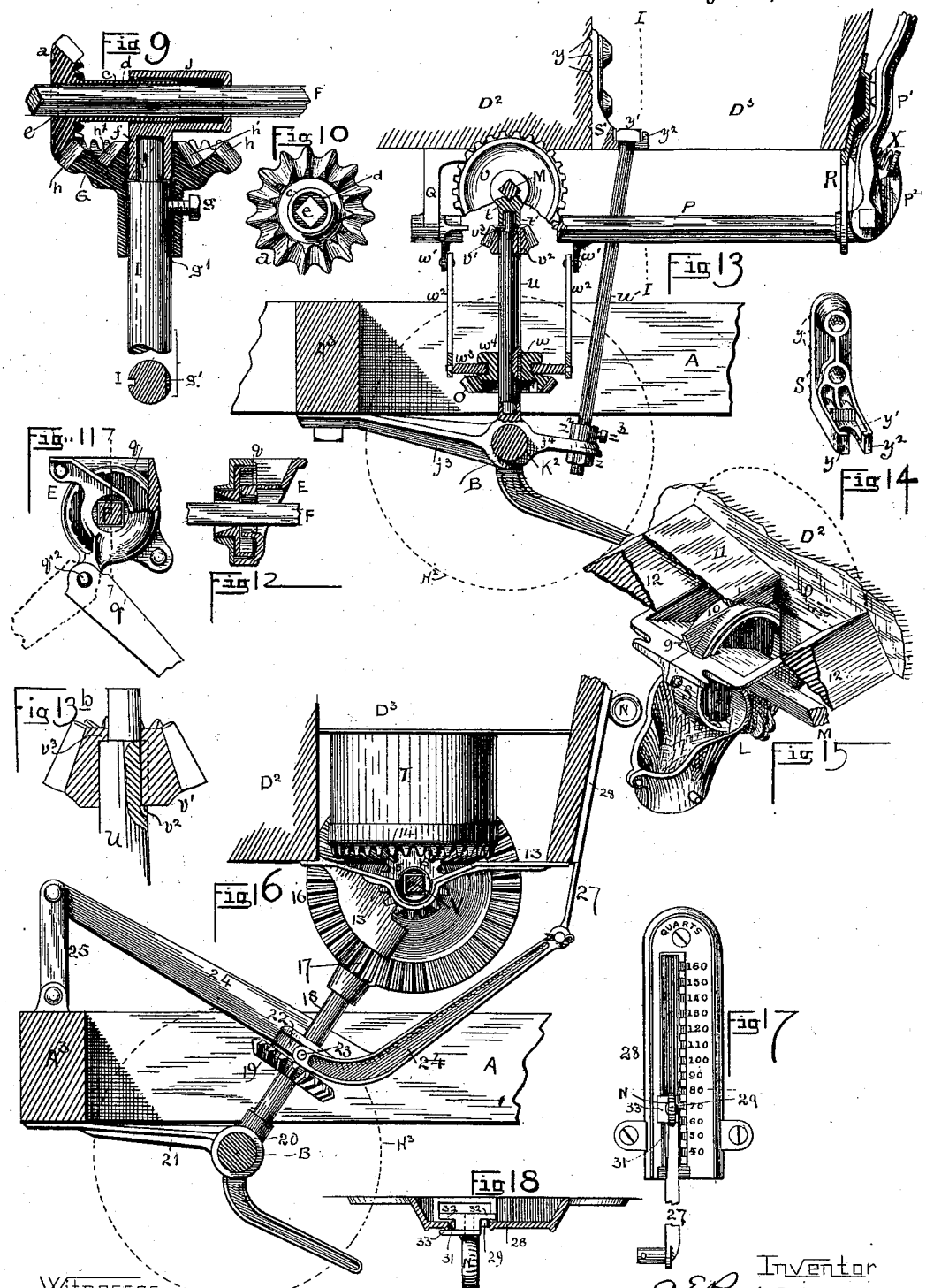
Witnesses
J. B. McGill
J. H. Stuart
Inventor
C. E. Patric
By R. D. O. Smith
Attorney (No Model.) 4 Sheets—Sheet 4.
C. E. PATRIC.
SEEDING MACHINE.
No. 367,231. Patented July 26, 1887.
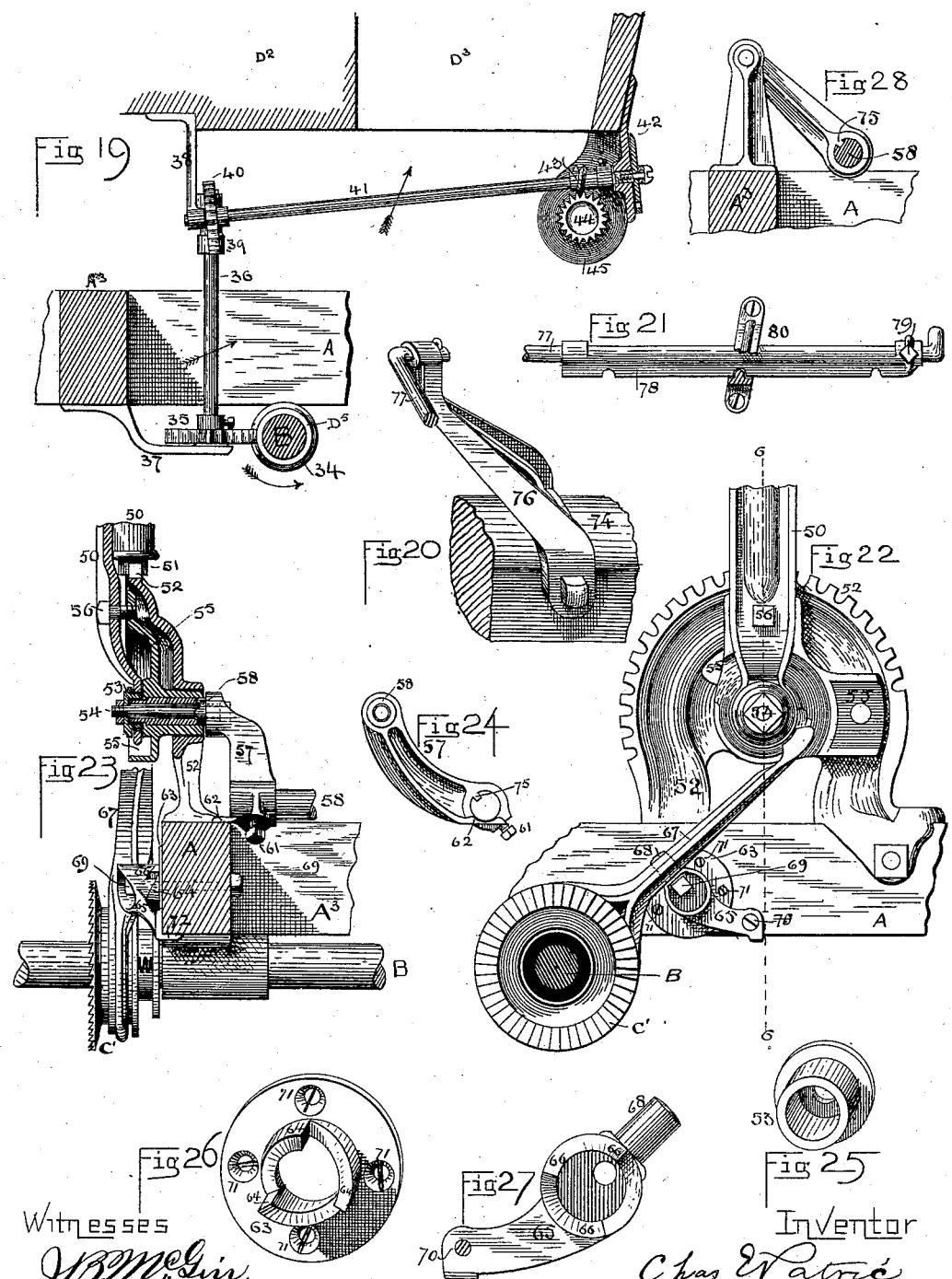

UNITED STATES PATENT OFFICE.

CHARLES E. PATRIC, OF SPRINGFIELD, OHIO.

SEEDING-MACHINE.

SPECIFICATION forming part of Letters Patent No. 367,231, dated July 26, 1887.

Application filed February 15, 1887. Serial No. 227,837. (No model.)

*To all whom it may concern:*

Be it known that I, CHARLES E. PATRIC, of Springfield, in the county of Clark and State of Ohio, have invented new and useful Improvements in Seed-Drilling Machines; and I do hereby declare that the following is a full and accurate description of the same, reference being had to the accompanying drawings, wherein—

Figure 1 is a perspective view of a drill entire. Fig. 2 is a perspective view of the under side of the hopper from the rear. Fig. 3 is a longitudinal section through hopper on line 1 1, Fig. 13, looking forward. Fig. 4 is a cross-section on line 2 2, Fig. 3, showing mechanism for driving grass-seed-feed shaft. Figs. 5 to 10, inclusive, are details of Fig. 4. Fig. 11 is a side elevation of the grass-seed distributer. Fig. 12 is a section of the same on line 7 7, Fig. 11. Fig. 13 is a cross-section on line 3 3, Fig. 3, showing mechanism for driving grain-feed shaft. Fig. $13^b$ is an enlarged section of pinion $v'$. Fig. 14 is a detail of a bracket in Fig. 13. Fig. 15 is a perspective view of the grain distributer. Fig. 16 is a cross-section on line 4 4, showing mechanism for driving the fertilizer-feed shaft. Fig. 17 is an elevation of the fertilizer-speed-indicator plate. Fig. 18 is a transverse section of the same. Fig. 19 is a section on line 5 5, Fig 3, showing surveyor-driving mechanism. Figs. 20 and 21 are perspective views of devices for setting hoes backward or forward, straight line or zigzag. Fig. 22 is a side view of lifting and shifting lever. Fig. 23 is a section on line 6 6, Fig. 22. Figs. 24, 25, 26, and 27 are details of Fig. 23. Fig. 28 is a side view of lifting-rod, crank-arm, and hanger. Fig. 29 is a longitudinal section through frame and doubletree-adjusting mechanism.

The frame, consisting of side bars, A, and cross-bars $A^2 A^3$, rests on axle B, carrying feed-driving mechanism, and is operated by rotation of wheels C. The hopper rests on frame A $A^2 A^3$, and has three compartments, D' $D^2$ $D^3$, for holding grass-seed, grain, and fertilizer, respectively. From the compartment D' the grass-seed is fed through the distributers E, located on the under side of said compartment. Said distributers are operated by the shaft F, which is driven by bevel-gears G and $h$, which are in turn driven by the rotation of axle B. The shaft I is provided at one end with bevel-gear G, in mesh with the pinion $a$ on shaft F, and at the other end with wheel $b$, adjustable on shaft I, and in mesh with the concentrically-toothed disk H'. Pinion $a$ is made with a long sleeve, $c$, having a round hole, $d$, cast longitudinally through, except at the end $e$, where it is made square to fit shaft F, Fig. 9. The hanger J is rigidly connected to bottom of hopper D', and is bored in one direction to receive sleeve $c$ and allow it to slide therein, and in another direction at right angles to the former has hub $f$, which is bored to receive the end of journal $f'$ of shaft I, hub and shaft I being of the same diameter. The wheel G is made rigid to shaft I. To regulate the speed of shaft F, the wheel G is provided with two rows of teeth, $h$ and $h'$, into either of which the teeth of pinion $a$ may engage, Fig. 9.

The lower end of shaft I has its step-bearing in a hub, I', Fig. 5, rigidly attached to the upper side of the bearing K, in which the shaft B is supported. The bearing K is attached on the cross-bar $A^3$ by the bracket-arm $j$. The bearing K is also provided at one end with ratchet-teeth $k$, having their points rounded or counterbeveled, and with a stop-lug, $l'$. The lever K' has at one end a ring, through which the shaft B also passes, and on one edge said ring is provided with teeth similar to the teeth $k'$, and with a stop, $l$, to engage stop $l'$ and limit the movement of said lever in one direction. The lever K' is confined between the bearing K and the gear-disk, and said ratchet-teeth are pressed into engagement by the disk-spring 49. When said teeth are in engagement, the disk is forward and in engagement with the pinion; but when the lever K' is thrown over until the stops $l$ $l'$ are engaged the disk is pressed back out of engagement with its pinion, and the counterbeveled ends of the teeth will have passed over their highest points, and the pressure of said spring will tend to keep them so.

Box K has a lateral projection provided with pin $j^2$, which projects upward. Pin $j^2$ carries the speed-indicator plate $m$ by passing through its base $n$, and is secured in position by spring-key $n'$, between which and the base $n$ is a spring, $o$. Notches $p$ are made in the edge of the plate $m$ and figures $p'$ are inscribed on its face. The grass-seed distributer has flange $q$ and spout $q'$, pivoted on $q^2$.

Gears G and $a$ are covered by shield $r$, Figs. 1 and 4, attached to the hopper by a hinge, which permits it to be removed from in front of said gears by turning on its hinge without liability to stick, as frequently happens to the sliding cover heretofore used.

From compartment $D^2$ grain is fed through distributer L, the feed-wheel S of which is driven by shaft M, with bearings in hanger $t$, which has hub $t'$ for the upper end of shaft $u$, the lower end of which rests in a hub on hanger $K^2$, attached by arm $j^3$ to frame-bar $A^3$. In the grass-seed distributer E the bridge-piece $q$ overhangs or extends beyond the edge of the feed-wheel, because it is found that the grass-seed, being very small, will sometimes get in between the wheel and bridge, where it is ground, crushed, and causes a great deal of friction. By means of the overhanging edge of the bridge the seed and any foreign matter falls below the line of the joint between the wheel and the bridge, and all trouble from the interposition of seed or dirt is obviated. A lug, $j^4$, is attached to hanger $K^2$, to receive the lower end of the suspension-bolt $u'$.

Shaft M is driven by bevel-gears $v$ on shaft M and pinion $v'$ on shaft $u$. The pinion $v'$ is cast with feather $v^2$ and shoulder $v^3$. Shaft $u$ is driven by sliding pinion O, with feather $w$, and engages with teeth on disk $H^2$. It is raised and lowered on shaft $u$ by rock-shaft P, crank-arms $w'$, links $w^2$, and collar $w^3$ around hub $w^4$ of pinion O, Fig. 13. Shaft P is supported at one end by hanger Q, and at the other end by a hanger forming a part of the dial-plate R. This rear end of shaft P is turned up, and at its extreme end a seat is formed for the coil-spring X, which is interposed between said seat and lever P', which is attached to the rock-shaft P to operate it. The upper end of the suspension-rod $u'$ is supported in a bracket, S', provided on its back with corrugations $y$ and at its front with a seat, $y'$, for the head of bolt $u'$, and lugs $y^2$ to retain said bolt-head. Lug $j^4$ is rigidly supported by rod $u'$, which is secured to said lug by nut $z$ and fixed set-collar $z^2$, with set-screw $z^3$.

The two seed-passages of grain are divided by partition 9, on top of curved bridge-piece 10, under the hinge of reversing-plate 11, which rests on the outer edge of ridge-piece 12.

The fertilizer is fed from apartment $D^3$ into cylinders T, which are supported on brackets 13, and caused to revolve by bevel-gear 14 on under side of cylinder, and pinion 15 on shaft V, which also carries bevel gear-wheel 16, meshing with pinion 17 on shaft 18. Shaft 18 is driven by sliding pinion 19 engaging with toothed disk $H^3$. Shaft 18 is journaled at its upper end in bracket 13 and at its lower end in a boss on hanger-bearing 20, around axle B, said bearing being supported by the bracket-arm 21, attached to frame cross-bar $A^3$. To raise and lower pinion 19 on shaft 18, a collar, 22, fitted about hub of pinion, has trunnion 23, to which a lever, 24, is pivoted. Lever 24 is fulcrumed on cross-bar $A^3$ by means of the pivoted link 25. Its rear end is attached to rod 27, which slides vertically in the speed-indicator 28. The upper end of rod 27 has a lug, 29, on one side, which engages with notches in the edge of the slot; also spring 31 on opposite side, to force the lug 29 into engagement with said notches. Guide-lugs 32 on rod 27 and 33 on plate, with ring N riveted to rod 27, keep said rod in place.

The collar $D^5$, Fig. 19, having worm 34 thereon, is rigidly secured to shaft B. Said worm engages with toothed wheel 35 on shaft 36, which is pivoted at its lower end to bracket 37 and at its upper end in bracket 38. At the upper end of shaft 36 is the collar 39, provided with a worm engaging toothed wheel 40 on shaft 41, also journaled in bracket at its forward end and in dial-plate at its rear end. At rear end dial-plate represents one acre or fractional part. Near the rear end of shaft 41 is the collar 43, having a worm thereon engaging toothed wheel 44 in the dial-plate 45, which registers the number of acres.

Each disk $H'$ $H^2$ $H^3$ has a long hub, 46, free to slide lengthwise on axle B, and on outer end are two feathers which engage in grooves on the collar 48, which is held rigidly on axle B. When lever K' is dropped, spring 49 forces disks either $H'$ $H^2$ $H^3$ against its pinion.

To raise the hoes, the lifting-lever 50, Fig. 23, is pulled backward and downward and held in position by the spring-bolt 51 engaging in the notches on arc 52. The hole in the lower end of lever 50 is bushed with a ring, 53, held rigidly in place by bolt 54. Lever 50 is also bolted to short lever 55 by bolt 56, Fig. 23. The lifting-crank arm 57 has at its upper end a wrist-pin, 58', which extends through the center of arc 52, and the lower end holds one end of the lifting-rod 58, (to which are attached the chains 59, leading to draw-bars 60, Fig. 1,) and secured thereto by set-screw 61. On the lower end of said lifting-crank there is also a stop-lug, 62, to engage the side bar, A, and limit the downward movement of said crank. A feather, 75, is also cast in the hole for the lifting-rod 58 to engage with a groove therein.

The plate 63, having ratchet-teeth 64, and plate 65, with corresponding teeth, 66, are bolted to the frame A by bolt 69. The plate 65 is provided with a pivot-pin, 68, for the clutch-lever 67, and with a screw, 70, and a lug, 72, for independent attachment to the frame A. The clutch-lever 67 is engaged with a cam on the lever 55 when the same is moved out of engagement with the similar clutch-plate on the wheel-hub, and the mechanism is thereby disconnected from the driver. To adjust the clutch-lever to its operative cam, the plate 63 is rotated on bolt 69, thus forcing the plate 65 and the pivot-pin 68 to a greater or less distance away, as shown in Fig. 23. When plate 63 has assumed its proper position, its holding-screws are inserted. To throw alternate hoes forward and backward into single or double rank, the bars 60 are alternately fastened to the double-rank bars 73 and 74. To the end of bar 74 a crank-arm, 76, is attached, and the outer end of the same is attached to a rod, 77, which has at its extreme end the notched plate 78, secured thereto by a set-screw, 79, and all rest in keeper 80.

The doubletree 81 has on its upper and under sides, at its center, a plate, 82, with boss and set-screw in each, and on the under side of frame-bar A² is an iron plate, 83, with boss on its under side to receive the top end of pipe 85. The bolt 88 passes down through the tongue 87, frame-bar A², pipe 85, and brace 86, which extends from the lower end thereof to some proper part of the tongue or frame to support the lower end of said pipe. The doubletree may therefore be adjusted up or down, according as it is desired to have the draft high or low, thus making the downward pressure at the end of the tongue heavy or light, as desired.

The quantity of seed to be sown to the acre is determined by the radial position of the sliding pinion $b$ on the disk-wheel H'. The object of still another change in speed by the double bevel-gear G is to give a very wide scope to quantity per acre. For instance, in some cases farmers desire to sow as low as two quarts of grass-seed to the acre. When the pinion is running in the smaller row of teeth, $h'$, in gear G, the disk-wheel H', having thirteen concentric rows of teeth, will then give the requisite speed for sowing from two to eight quarts per acre, making pint-changes. In certain dairy regions sixteen quarts to the acre is often required. To meet such wants, all that is required is to place the pinion $a$ on the grass-seed-feed shaft in the larger row of teeth, $h$, which gives just double the speed, and will consequently sow from four to sixteen quarts to the acre, making thirteen quart-changes. By this arrangement a very wide range of quantity can be had in the same machine, and without change of parts.

The flexible tube or spout $q'$, being movable on its pivot $q^2$, delivers the seed broadcast, either in front or rear of the hoes, as may be desired. The spouts $q'$ are secured to the grass-seed distributers by a stud cast upon one side of the distributer-shell and a small cap-screw cast upon the opposite side. Said screw is made to run tightly in its threaded hole, making sufficient friction to not turn when set down on the ear of the sheet-metal spout, and it will be held in any position by the frictional pressure of said cap-screw, and by putting said screws on the proper side it will be tightened by any movement of the spout out of position.

The indicator-plate $m$, Fig. 5, has upon its face a double row of figures. Those upon the left-hand side denote the proper position, or rows of teeth on the disk-wheel H', for the sliding pinion when the feed-shaft F is running at a high speed. The left-hand row of figures is used for the same purpose when said shaft is running at slow speed for extremely small quantities. Said indicator-plate is pivotally attached to the bracket-hanger $j$ by means of a stud, $j^2$, cast with the said bracket, Figs. 5 and 7. Around the stud $j^2$ is wrapped a wire spring, $o$, with coils wound slightly apart. A cotter or pin passes through the stud just over the spring, compressing its coils, which gives sufficient pressure on the base of the indicator-plate to hold it in an upright position, and yet free to swing on the stud when necessary to allow the sliding pinion to pass up or down. One of the terminal ends of this wire spring reaches forward along the side of the hanger and hooks underneath it. The opposite end of said wire presses against the perpendicular edge of the indicator-plate with sufficient pressure to hold it against a stop on the hub of the axle-hanger, in which position the notched edge embraces the teeth of the sliding pinion, and nearly touching them. These projections embrace the pinion-teeth and serve to hold the pinion from dropping down when the disk-wheel is temporarily thrown out of gear to permit the pinion to be shifted up or down, but without making contact with them while in action. It will be seen that this spring acts in two ways—viz., as a compression-spring, holding the indicator on its seat, and as a lever-spring, holding the same in position against the stop. The indicator is therefore easily detached, when required, for transportation or otherwise.

A great deal of trouble has been experienced by manufacturers and users of grain-drills by the constant tendency of the central portion of the frame to spring down, carrying the axle with it, thus compelling it to revolve while out of a straight line and causing a great deal of friction and wear of the axle and bearings. This causes the ground-wheels to approach the ends of the hopper, and sometimes to come in contact with the levers and other devices. The cross bars of the frame could not well be made sufficiently stiff to resist the tendency of the spring downward, in consequence of the load being suspended from points (the wheels) outside of the frame. The hopper being composed of wide boards standing edgewise and possessing great strength, I make use of these boards to sustain the axle and other portion of the machine in a true rigid position by means of the sustaining-bolts $u'$, K², and $g$, and brackets shown in Fig. 13.

When the drill is set up, the sustaining-bolt is hung by its head in the bracket S' and its nut $z$ on the lower side of the bracket K² is screwed up until the axle is in exact line, and the set collar $z^2$ (also threaded) is screwed up on top of hanger and its set-screw $z^3$ firmly tightened. When the drill is shipped "knock down," these parts are detached and the hopper is taken off. When it is again set up, the stop-collar serves as a stop and determines the position of the part, requiring neither skill nor special tools.

Having described my invention, I claim—

1. The disk gear-wheel having concentric rows of gear-teeth mounted on and turned by shaft B, with means to permit longitudinal motion thereon, combined with the bracket-collar bearing K for said shaft, provided with ratchet-teeth $k$ and a step-bearing, a pinion to be driven by said disk-wheel engaging with one of its concentric rows of teeth, a shaft for said pinion stepped in said bearing, combined with a lever, K', provided with ratchet-teeth $k'$, in engagement with teeth $k$, whereby said disk-wheel may be moved into or out of gear with its pinion.

2. The disk gear-wheel H', having concentric rows of gear-teeth mounted on and turned by the shaft B, with means for moving said disk longitudinally on said shaft, a pinion to be engaged and driven by said disk-wheel, being adjustable on its shaft, and thereby caused to engage with one or another of said rows of gear-teeth, combined with the movable dial-plate $m$, provided on its edge with notches $p$, to temporarily engage said pinion and hold it in place when the disk-wheel H' is moved out of engagement.

3. The disk gear-wheel H', provided with concentric rows of gear-teeth, and the pinion $b$, adjustable on its shaft, and thereby caused to engage with one or another of said rows of gear-teeth, combined with a dial, $m$, provided on its edge with notches $p$, to temporarily hold said pinion in place when said disk-wheel is withdrawn, and on the face of said dial a series of figures indicating different quantities of seed discharged when the pinion occupies its different positions.

4. The shaft B, combined with the central bearing, K², provided with a bracket-arm, $j^3$, attached at its extremity to the frame and supported by a rod extending up to the hopper, whereby said shaft is supported intermediate to its principal bearings on the side bar of the frame.

5. The shaft B and its bracket bearing K, supported at one side by attachment to the frame, combined with the bracket S', having the open seat $y'$, and the suspension-rod $u'$, having at one end a head or hook to engage said seat and at its other end an adjustable set collar or nut, $z^2$, and a holding-nut, $z$, whereby after proper adjustment of said bracket-bearing the parts may be separated for shipment and reassembled without adjustment.

6. The lifting-rod 58, supported at one end by the crank-arm pivoted to a standard bolted to the frame, combined with the crank-arm 57, provided at one end with the wrist-pin 58', the angle-lever plate 55, and the bracket-bearing 52, and at the other end with a socket for the lifting-bar 58 and a stop to engage the frame and limit its downward movement.

7. The double-rank bar 74, provided with the bracket 76, and the controlling-rod 77, provided at its free end with adjustable stop-plates 78, combined with a stop loop or lug, 80, attached to the hopper A, whereby the initial position of the rank-bar may be varied by adjusting said stop-plate on said rod 77.

8. The clutch-lever 67 and its fulcrum-plate 65, provided with ratchet-teeth 66, and means for attaching said plate to the frame, combined with the adjusting-lever plate 63, provided with ratchet-teeth 64, whereon the teeth may rest and be supported, whereby the fulcrum-pin 68 may be supported at a greater or less distance from the frame, as may be required for the proper position of the clutch-lever.

9. The frame A A² A³ and tongue 87 of a seeding-machine, and the doubletrees 81, to which the team is attached, combined with the rod 85, rigidly secured at its upper end to the said frame and tongue and at its lower end supported by a brace, 86, and the plates 82, adjustable on said rod, whereby the doubletree 81 may be placed at the desired elevation, as set forth.

10. The shaft F, provided with the pinion $a$, mounted on and turned by said shaft and capable of longitudinal movement thereon, said pinion being provided with a long hub, cylindrical on its outside, the hollow hub-bearing J for the same, said hub-bearing being provided with a step-bearing, $f$, for the shaft I, and the pinion G, provided with two rows of gear-teeth, $h\ h'$, on said shaft I, whereby, without varying the speed of shaft I, the speed of shaft F may be varied.

11. The shaft F, whereby the distributers are actuated, the shifting pinion $a$, and double pinion G, the shaft having on it said pinion G and the adjustable pinion $b$, the disk gear-wheel H', whereby shifting said pinion $a$ will vary the speed of said shaft F and shifting the pinion $b$ will vary the speed of the shaft I, in combination with a dial-plate, $m$, having on its face two series of figures indicating two series of quantities possible to be discharged by reason of the position of the pinion $a$.

12. The shield $r$, hinged to the hopper in front of and to protect the pinions $a$ and G, being kept in position by gravity and capable of being turned up on its pivot, for the purpose set forth.

13. The disk-wheel mounted on the main shaft and capable of motion longitudinally thereon, and the hanger-bearing K, provided with teeth $k$, combined with the lever K', provided with corresponding ratchet-teeth, said lever being interposed between said disk-wheel and bearing for the purpose of moving said disk-wheel upon its shaft, as set forth.

14. The hanger-bearing K, provided with ratchet-shaped teeth $k$, the ends whereof are rounded or counterbeveled, the lever K', provided with similar ratchet-teeth, combined with the disk gear-wheel, and a stop to limit the movement of said lever, whereby when said teeth are moved out of engagement they will be arrested when their counterbeveled points have passed their highest points in engagement, as set forth.

15. The hanger-bearing K, provided with ratchet-shaped teeth $k$, the ends whereof are rounded or counterbeveled, and with a stop-stud, $l'$, the lever K', provided with corresponding ratchet-teeth and with a stop-stud, $l$, combined with a disk gear-wheel, whereby as said teeth move out of engagement they will be arrested by engagement of said stop-studs with the counterbeveled portions of said teeth in engagement, as set forth.

16. The bracket-extension $n$, provided with the stud $j^2$, combined with the dial-plate $m$, provided with a series of notches, $p$, pivoted upon said stud $j^2$, and a retracting-spring, whereby said dial may swing out of normal position and be automatically returned, as and for the purpose set forth.

17. The bracket-extension $n$, provided with the stud $j^2$, combined with the dial-plate $m$, provided with a series of notches, $p$, pivoted upon said stud, and the spring $o$, adapted to press said plate laterally and downwardly on its seat, as set forth.

18. Combined with the suspension-rod $u'$, the bracket S', provided with the projecting arm $y$, the seat $y'$, and the marginal flange $y^2$, to receive and securely hold the head of said suspension-rod $u'$, whereby said rod may be attached without trouble when required for transportation, &c.

19. The pinion provided with feather $v^2$ in the axial opening and an inwardly-extending flange, $v^3$, said feather and flange being cast integral with said pinion, as set forth.

20. The disk gear-wheel, combined with the pinion $w^4$, shaft $u$, whereon said pinion slides, the yoke $w^3$, lifting-rods $w^2$, and rock-shaft P, provided with arms $w'$, whereby said pinion $w^4$ is shifted to different points of engagement with said disk-wheel, as set forth.

21. The lever P' and spring $x$, combined with the rock-shaft P, having its outer end curved upward to form a seat for said spring, as set forth.

22. The rock-shaft P, provided with lateral arms $w'$, flattened part $P^2$, to receive the fork of the lever, and with said flattened end curved upward to constitute a seat for the lever-spring, as set forth.

23. In a force-feed grain-distributer, an elevated wheel, a curved bridge-piece, 10, provided with the rib 9, straight on its upper edge, combined with the reversing-plate 11, hinged directly above said rib, for the purpose set forth.

24. The main shaft B and the bracket-bearing for the same about the middle of its length, combined with the suspension-bolt attached at one end to said bracket and at the other end to the side of the hopper, whereby the center bearing of said shaft is supported by the strength of the wide boards of the hopper.

25. The suspension-bolt $u'$, provided at one end with a fixed head and at the other with a collar, $z^2$, and set-screw $z^3$, and the nut $z$, combined with the open-seated bracket S' and the bracket-bearing arm $j^4$.

26. The shaft 18, for driving the fertilizer-distributer, and the pinion 19, for receiving motion from the disk gear-wheel, combined with the arm 24, fulcrumed on the frame and provided with the clutch-collar 22, in engagement with said pinion, and the dial-plate 28, and means for locking said arm to said plate.

27. The force-feed distributer-wheel, combined with an overhanging bridge, $q$, whereby seeds and foreign matter fall past the joint between wheel and bridge, as and for the purpose set forth.

CHARLES E. PATRIC.

Witnesses:
 EDWARD L. BUCHWALTER,
 T. F. McGREW, Jr.